Figure 1:
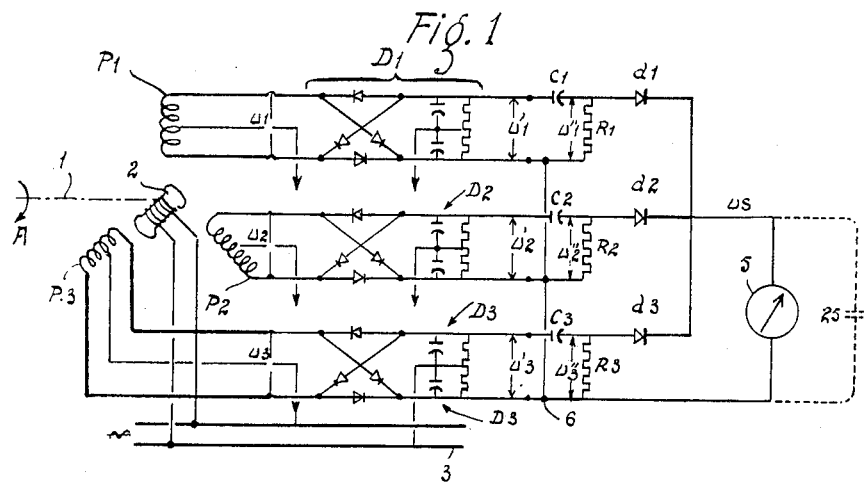

May 24, 1966  F. MAYER  3,253,218
TACHOMETER UTILIZING A ROTATING TRANSFORMER
Filed Dec. 28, 1961  2 Sheets-Sheet 2

Inventor:
Ferdy Mayer
by: George L. Spencer
Attorney

# United States Patent Office 3,253,218
Patented May 24, 1966

3,253,218
TACHOMETER UTILIZING A ROTATING TRANSFORMER
Ferdy Mayer, Grenoble, France, assignor to Inventions Finance Corporation, a corporation of Delaware
Filed Dec. 28, 1961, Ser. No. 162,889
Claims priority, application France, Jan. 3, 1961, 848,680
7 Claims. (Cl. 324—70)

My invention has for its object tachometers, particularly for measuring low speeds, of the type including an electro-mechanical collector adapted to be driven into rotation by a driving shaft, the speed of which is to be controlled, said collector feeding across a pair of utilization terminals an electromotive force which is proportional to the angular speed of said shaft.

A conventional example of a tachometer of this type is the tachometer dynamo machine or induction tachometer. Such apparatus are however not fit for use at low speeds such as those appearing in numerous applications such as the measurement of the progression in the drilling of bore holes for mineral oil, the tachometric return in large power control systems, as in the case of ordnance turrets, high range radar aerials having a large reach and the like. For speeds ranging between a few revolutions per minute and a few hundredths of a revolution per minute, such as those which are of interest for such applications, it has been necessary hitherto to resort to special apparatus; the known embodiments of this type produce a voltage varying as a linear function of the angular setting of the driving shaft, this being provided by causing said shaft to drive the slider of a potentiometric device, while a differentiation circuit allows defining, starting from the variable voltages thus obtained, a signal proportional to the speed.

These known arrangements show serious drawbacks since the movable tap of the potentiometric device is liable to be worn and its slider produces a quite noticeable noise which limits the possibilities of increasing sensitivity; all known arrangements of this type require furthermore the use of electronic amplifiers.

My invention has for its object tachometers of the type considered which do not show the above-mentioned drawbacks, as provided by the cutting out of the rotary potentiometer and of all associated operative elements such as amplifiers and the like.

According to my invention, the potentiometer is replaced by a rotary transformer including a rotor mechanically coupled with the driving shaft and carrying a one-phase field-piece fed by a supply of A.C. and a stator carrying a poly-phase armature winding. A rectifying circuit is connected with each of the phases of said stator, while a time differentiation circuit is fed by the output end of each rectifier and a switch is permanently adapted to connect across the input terminals of a voltage responsive means, the output from that differentiation circuit which feeds a voltage which is higher than that supplied by the other circuits.

It is possible through said arrangement to produce an entirely static embodiment, the appearance of which is that of a conventional tachometric machine adapted to execute performances which are not only good, but which are better than those of tachometers incorporating potentiometric movable taps.

The features and advantages of the invention will appear readily from the following description of various embodiments given by way of example, reference being made to the accompanying drawings, wherein:

FIG. 1 is a wiring diagram of my improved tachometer.

Figure 2:
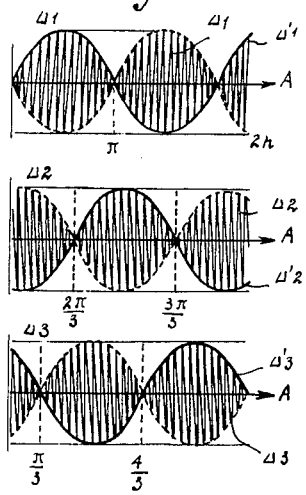
Figure 3:
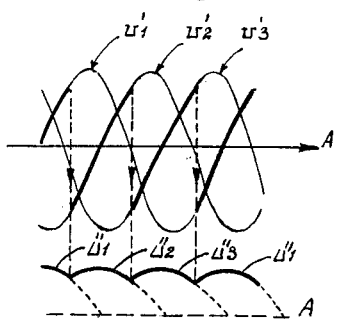
Figure 4:
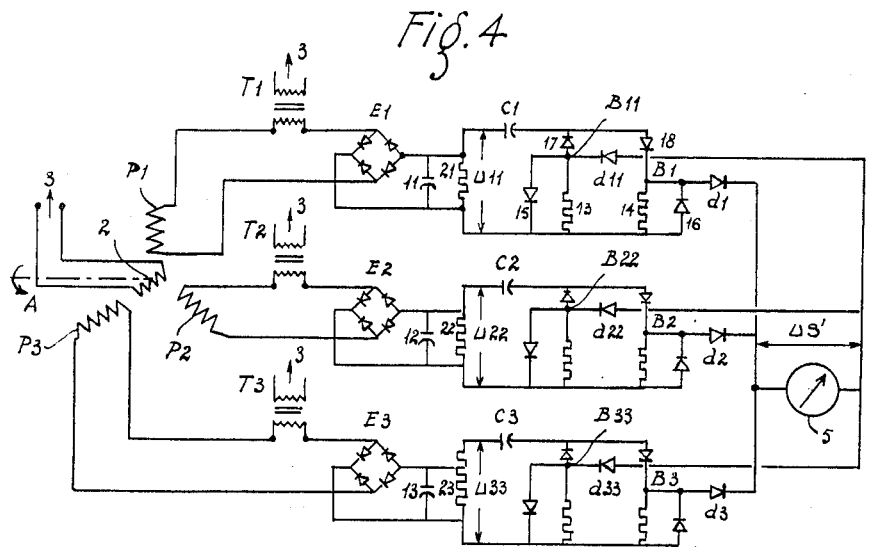
Figure 5:
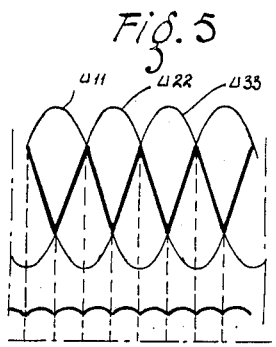
Figure 6:
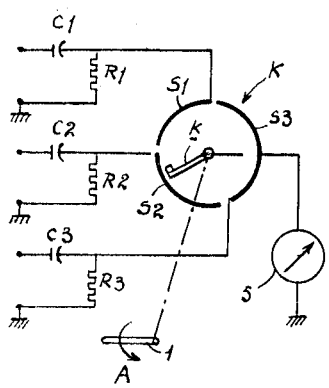
Figure 7:
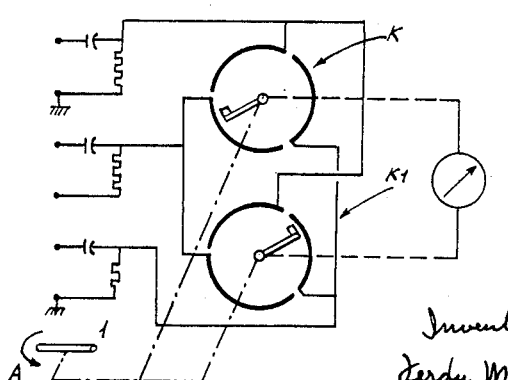

FIGS. 2 and 3 are explanatory graphs.
FIG. 4 is a modified wiring diagram of a modification.
FIG. 5 is a graph corresponding to FIG. 4.
FIGS. 6 and 7 illustrate diagrammatically two switches of a mechanical type.

In the embodiment illustrated, the reference number 1 designates the shaft of which it is desired to ascertain the speed of rotation, said shaft driving into rotation the rotor 2 of a rotary transformer or synchronous transmitting machine, the field winding including one pair of poles, for instance, carried by said rotor and being fed by a supply of substantially sinusoidal A.C. voltage.

The rotary transformer is polyphase, for instance three-phase in the example illustrated, and its stator carries consequently three windings $P_1$, $P_2$, $P_3$. Each of said windings is connected with a synchronous demodulator D followed by a time differentiation circuit including a condenser C and a resistance R. A measuring instrument 5 such as a microammeter, for instance, is connected with one of the terminals of the resistances R1, R2, R3 through the agency of corresponding diodes $d1$, $d2$, $d3$ connected in parallel and it is connected with the other terminals of said resistances through a common connection 6.

As illustrated in FIG. 2, when the field piece 2 revolves, each of the phases P1, P2, P3 of the stator feeds an amplitude modulated voltage of A.C., said modulation following the angular movement A of the field piece with reference to the phase considered, the voltages U1, U2, U3 of the successive phases being angularly shifted by $2\pi/3$ in the case considered and by $2\pi/n$ in the general case of an $n$-phase transformer. At the output end of each synchronous demodulator D1, D2, D3, there are obtained detected voltages $U'_1$, $U'_2$, $U'_3$, the variations of which follow the envelope of the voltages U1, U2, U3 and wherein the carrier wave, that is the general signal corresponding to the frequency of the supply 3, is cut out.

Said voltages $U'_1$, $U'_2$, $U'_3$ being applied to the corresponding time differentiation circuits $C_1R_1$, $C_2R_2$, and $C_3R_3$, the voltages $U''_1$, $U''_2$, and $U''_3$, respectively, collected across the output terminals of the latter, pass through a peak value each time the corresponding voltage $U'_1$, $U'_2$, or $U'_3$ passes through zero (FIG. 3), while the voltages US obtained on the downstream side of the diodes $d_1$, $d_2$, and $d_3$ across the terminals of the measuring instrument 5 and its variations are given by the heavy line curve drawn in the lower part of FIG. 3. Such time differentiation circuits, when supplied with a sine wave input, perform the inherent function of producing an output sine wave having a frequency which is equal to that of the input sine wave and an amplitude which is directly proportional to the input sine wave frequency. Said diodes $d_1$, $d_2$, and $d_3$ being connected in parallel form, as a matter of fact, a logical circuit of the Or type, while the measurements remain synchronized with the areas of substantially linear modifications in the detected voltages $U'_1$, $U'_2$, and $U'_3$, which areas, drawn in heavy lines in the upper section of FIG. 3, extend over angles equal to $\pi/3$ to either side of the passage through zero from negative to positive values; the residual undulation of the output voltage US is equal to 17% in the case considered corresponding to a sinusoidal variation of the enveloping curve of voltages $U'_1$, $U'_2$, and $U'_3$ with reference to the angle A.

A first obvious means for reducing said rate of residual undulation consists in increasing the number of phases while a second means consists in winding the rotary transformer so as to obtain a linear function for the output voltages to either side of the passage through zero.

FIG. 4 illustrates a modification of my invention and, in this case, the same reference numbers designate the members which have already been described with reference to FIG. 1; the voltages U1, U2 U3 fed by the different phases P1, P2, P3 are rectified, in the case of FIG. 4, by mere diode bridges E1, E2, E3, after there has been added to each phase voltage, through the agency of an auxiliary transformer T1, T2 or T3, a reference voltage having the same frequency as the carrier voltage, while its amplitude is equal to that of the maximum voltage fed by each phase; the A.C. component being filtered out by condensers 11, 12, 13, there is thus obtained across the terminals of the resistances 21, 22, 23 corresponding thereto, voltages U11, U22, U33, the curves defining which are given out by FIG. 5. Each of said voltages is applied to a suitably directed time differentiation circuit including, for instance, for the first phase, beyond a condenser C1, two resistances in parallel 13, 14 which are each shunted by a corresponding diode 15, 16, said resistances being inserted in series with further diodes 17, 18, the operative directions of which are opposed to each other. The measuring instrument 5 has one of its terminals connected with the terminals B1, B2, B3 of the resistances 14, with the insertion therebetween of the diodes $d1, d2, d3$, inserted in parallel and its other terminals B11, B22, B33 through the second group of diodes $d11, d22, d33$ also inserted in parallel and consequently the voltage US' applied across said terminals of the instrument varies, as shown by the curve illustrated in the lower part of FIG. 5, as provided by the rectification of the two alternations of the differentiated voltages on the downstream side of the condensers C1, C2, C3. The rate of undulation is thus reduced in this case to 5%, as compared with 17% for the wiring diagram of FIG. 1. It should be, of course, understood that the above-disclosed means for reducing still further said rate of undulation remain perfectly valid in all cases. In certain cases, a filtering at the output end may also be considered, said filtering being obtained optionally, for instance, by means of a condenser inserted, as illustrated at 25 in FIG. 1, in parallelism with the instrument 5.

The wiring diagrams disclosed produce a unidirectional signal, that is a signal of an unvarying polarity, whatever may be the direction of rotation. In order to obtain, if required, a signal which varies with the direction of rotation, it is possible to substitute for the electronic switching described, a mechanical switching.

FIG. 6 shows diagrammatically a mechanical switch adapted to be substituted in a diagram of the type illustrated in FIG. 1, for an electronic switch formed by the group of diodes $d1, d2, d3$.

In this case, I resort to three sectors S1, S2, S3 forming a mechanical switch K, of which the brush-carrying arm $k$ is keyed to the shaft 1, so as to ensure the connection of each phase winding for an accurately defined angular position of the energizing rotor, which position may be deduced, for instance, from the diagram of FIG. 3.

FIG. 7 shows similarly the mechanical equivalent of the wiring diagram of FIG. 4 as concerns the electronic switching obtained, by two groups of diodes $d1, d2, d3$, on the one hand, and $d11, d22, d33$, on the other hand. The part played by said two groups in FIG. 4 is played, in the mechanical version illustrated in FIG. 7, by two switches K1, K2, the rotary arms of which are phase-shifted with reference to each other by 180°. These switches may be constituted advantageously by printed circuits forming cakes, fitted inside the rotary transformer, the switching being performed without any difficulty, since the adjacent circuits are at the same potential at the moment of the switching.

In a test made with my improved tachometer executed for investigation purposes, as illustrated in FIG. 1, the rotary transformer provided with a field piece carrying one pair of poles, fed, after rectification, a maximum voltage $U'_1, U'_2,$ or $U'_3$ of 100 efficient volts per phase, which provided a slope (FIG. 3) of about 290 volts for one third of a revolution, to wit $V = 870$ volts per revolution. The output voltage obtained after derivation is given by the formula $$U''_1, U''_2, \text{ or } U''_3 = \frac{VRC}{T}np$$

in which T is the duration of rotation, RC the time constant of the differentiating means in seconds, $n$ the number of alternations (1 in the case of FIG. 3 and 2 in the case of FIG. 5) and $p$ the number of pairs of poles on the field piece. This formula is valid, provided there is obtained a good differentiation; in other words, RC should be clearly lower than $T/p$ and R should be much larger than the internal resistance of the corresponding source of the voltage $U'_1, U'_2,$ or $U'_3$.

For a range of speeds extending between zero and 1 r.p.m., a time constant RC is selected, which is clearly lower than 60 sec., say 3 sec. for instance. There is obtained thus an output voltage for 1 r.p.m. equal to $$U''_1, U''_2, \text{ or } U''_3 = \frac{870 \times 3}{60}$$

or about 44 volts in the case of the wiring diagram of FIG. 1 ensuring a single alternation ($n=1$). The background noise level is readily less than 0.1 volt so that it is possible to measure without any difficulty 0.002 r.p.m. The undulations superposed over the comparatively large output voltage in this wiring diagram (17%) are substantially cut out through the incorporation of the condenser 25. The instrument 5 being a sensitive microammeter, changes in range may be performed by changing the values of $R_1, R_2,$ and $R_3$ and $C_1, C_2,$ and $C_3$.

The accuracy and the linear operation of the tachometer constructed according to the present description should be at least equal to that of a conventional tachometric machine. It is sufficient for this purpose to provide a rotary transformer feeding a wave having a pure shape and, obviously, it is necessary to feed the system through a supply 3 of stabilized A.C. voltage which contains only few harmonics. In the case of a feeding through A.C. mains, said supply may include, for instance, a small ferroresonant transformer and a filter for the harmonics.

My invention is obviously not limited to the selected embodiments described which have been given out solely by way of exemplification. I have already mentioned the possibility and the interest of increasing the number of phases; it is also possible, obviously, to increase the number of poles of the rotary field piece with a view to adjusting the electric angle between 0 and 360° for a fraction of a mechanical revolution. In order to operate with higher speeds, it is possible to increase the frequency of the carrier wave by resorting to a feed frequency of 400 cycles, for instance.

The arrangements described appear to be of a considerable interest for tachometric purposes at low speeds and even at higher speeds. They allow obtaining, as a matter of fact, a continuous output signal without a time constant and without any electromechanical switching through a commutator. The interest and the possibilities of application for measuring speeds and, chiefly in the case of reaction chains of servomechanisms, are obvious.

What I claim is:

1. A tachometer arrangement for measuring the speed of rotation of a rotary member comprising: a source of A.C. voltage; a rotary transformer including a one-phase field piece winding electrically connected across said A.C. voltage source and mechanically connected to rotate with said rotary member, and a polyphase stator winding; a plurality of rectifying detecting circuits, one for each stator phase, each of which is electrically connected across a respective phase of said stator winding; a plurality of differentiation circuits, one for each of said rectifying detecting circuits, each of which differentiation circuits is electrically connected to receive the output of a respective one of said rectifying detecting circuits; voltage responsive means; and switching means electrically connected to all of said differentiating circuits and to said utilization circuit for connecting, at every moment, said voltage responsive means to only that one of said differentiating circuits which is producing the highest voltage, said highest voltage being substantially proportional to the frequency of rotation of said rotary member.

2. A tachometer as recited in claim 1, wherein said switching means comprises a plurality of diodes, each of which is connected between a respective one of said differentiating circuits and said voltage responsive means.

3. A tachometer as recited in claim 1, wherein said source of A.C. voltage comprises a filter for removing unwanted harmonics from its output.

4. A tachometer as recited in claim 1 wherein said switching means comprises a mechanical switching system including at least one movable contact member rotating in unison with said rotary transformer field piece and electrically connected to said utilization circuit, and a plurality of stationary contact members, each of which is connected to a respective one of said differentiating circuits, oriented along the path of said movable contact in such a manner that said movable contact member is at every moment in contact with only that one of said stationary contact members having the highest voltage.

5. A tachometer as recited in claim 1, wherein each of said differentiating circuits comprises a capacitor connected in series with the output of its respective rectifying detecting circuit.

6. A tachometer as recited in claim 1, wherein each of said differentiating circuits comprises a pair of resistances, a common junction to which one side of each of said resistances is connected, a first pair of diodes each of which is connected in series with a respective one of said resistances, a second pair of diodes each of which is connected in parallel with a respective one of said resistances in an opposite polarity sense from the one of said first pair of diodes which is connected to the same resistance, the polarity sense of the diodes associated with one of said resistances being opposite from that of the corresponding diodes associated with the other one of said resistances, a capacitor having one terminal connected to both of the branches formed by said resistors and said first pair of diodes and the other teminal connected to the output of its respective rectifying detecting circuit, and connecting means connecting the common point between each of said first pair of diodes and its respective resistance to said switching means.

7. A tachometer according to claim 1 further comprising conductor means for connecting said A.C. voltage source to each of said rectifying detecting means to provide a polarity reference for the output from said last-named means.

References Cited by the Examiner
UNITED STATES PATENTS

| | | | |
|---|---|---|---|
| 2,484,618 | 10/1949 | Fisher | 324—77 |
| 2,839,726 | 6/1958 | Demetriou | 324—158 |
| 2,881,312 | 4/1959 | Ressler | 329—107 |
| 2,958,038 | 10/1960 | Kwast | 324—70 |
| 3,044,013 | 7/1962 | Peck | 324—70 |

WALTER L. CARLSON, *Primary Examiner.*

FREDERICK M. STRADER, *Examiner.*